United States Patent
Murase et al.

(10) Patent No.: US 10,602,013 B2
(45) Date of Patent: Mar. 24, 2020

(54) READING MODULE AND IMAGE FORMING APPARATUS PROVIDED WITH THE SAME

(71) Applicant: KYOCERA Document Solutions Inc., Osaka (JP)

(72) Inventors: Takaaki Murase, Osaka (JP); Kei Ouchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/055,626

(22) Filed: Aug. 6, 2018

(65) Prior Publication Data
US 2019/0045074 A1 Feb. 7, 2019

(30) Foreign Application Priority Data
Aug. 7, 2017 (JP) ................ 2017-152137

(51) Int. Cl.
*H04N 1/40* (2006.01)
*H04N 1/193* (2006.01)
*H04N 1/00* (2006.01)

(52) U.S. Cl.
CPC ....... *H04N 1/1937* (2013.01); *H04N 1/00795* (2013.01); *H04N 1/1934* (2013.01); *H04N 2201/02439* (2013.01)

(58) Field of Classification Search
None
See application file for complete search history.

(56) References Cited

U.S. PATENT DOCUMENTS

| 6,177,667 | B1* | 1/2001 | Fujita | B41J 2/451 250/216 |
| 8,345,325 | B2 | 1/2013 | Schmidt et al. | 358/475 |
| 2009/0129830 | A1* | 5/2009 | Adachi | G03G 15/0131 399/308 |
| 2010/0002273 | A1* | 1/2010 | Schmidt | H04N 1/03 358/475 |
| 2010/0245940 | A1* | 9/2010 | Lai | H04N 1/03 358/474 |
| 2011/0038019 | A1* | 2/2011 | Kawano | H04N 1/0306 358/475 |
| 2011/0249304 | A1* | 10/2011 | Kaise | H04N 1/02825 358/474 |
| 2017/0346987 | A1* | 11/2017 | Ouchi | H04N 1/393 |
| 2018/0035001 | A1* | 2/2018 | Murase | H04N 1/02835 |
| 2018/0035002 | A1* | 2/2018 | Murase | H04N 1/02835 |

(Continued)

FOREIGN PATENT DOCUMENTS

JP 2003-121608 A 4/2003

*Primary Examiner* — Cheukfan Lee
(74) *Attorney, Agent, or Firm* — Stein IP, LLC (57) ABSTRACT

A reading module of the present disclosure is provided with a light source, an optical system, and a sensor. The optical system images, as reading light, reflected light of light radiated from the light source to an illumination object. The sensor converts the reading light imaged by the optical system into an electric signal. The optical system is provided with a mirror array in which a plurality of reflection mirrors are disposed in an array in a prescribed direction and a plurality of aperture stop portions that adjust an amount of the reading light. Each of the reflection mirrors is disposed at a prescribed distance from an adjacent one of the reflection mirrors in a prescribed direction.

17 Claims, 5 Drawing Sheets

(56) References Cited

U.S. PATENT DOCUMENTS

| | | | | |
|---|---|---|---|---|
| 2018/0149861 A1* | 5/2018 | Ouchi | ............... | G02B 27/0025 |
| 2018/0152580 A1* | 5/2018 | Murase | ............. | H04N 1/02885 |
| 2018/0152581 A1* | 5/2018 | Murase | ............... | H04N 1/0306 |
| 2019/0045073 A1* | 2/2019 | Murase | ............... | H04N 1/1937 |
| 2019/0222711 A1* | 7/2019 | Kobayashi | ........... | H04N 1/1052 |
| 2019/0230241 A1* | 7/2019 | Ouchi | ................... | G02B 17/08 |

* cited by examiner

READING MODULE AND IMAGE FORMING APPARATUS PROVIDED WITH THE SAME

INCORPORATION BY REFERENCE

This application is based upon and claims the benefit of priority from the corresponding Japanese Patent Application No. 2017-152137 filed on Aug. 7, 2017, the entire contents of which are incorporated herein by reference.

BACKGROUND

The present disclosure relates to a reading module that radiates light to an illumination object and reads reflected light reflected thereon and to an image forming apparatus provided with the same.

Conventionally, as a reading method of an image reading device incorporated in a multi-functional peripheral or the like using an electrophotographic process, there are known a CCD method using a charge coupled device referred to as a CCD (charge coupled device) sensor and a CIS method using an optoelectronic conversion device referred to as a CMOS (complementary MOS) sensor.

In the CCD method, by use of a plurality of plane mirrors and optical lenses, a reduced image is formed on an image sensor whose size is ⅕ to ⅑ of a size of an original document and then is read. One advantage of the CCD method is that a deep depth of field is obtained. Herein, a depth of field refers to a range in which, even when a subject (herein, an original document) is displaced in an optical axis direction from an accurately in-focus position, the subject is seen as if the subject is in focus. This means that, with a deep depth of field, even when an original document is displaced from a predetermined position, a fairly satisfactory image can be read.

On the other hand, one disadvantage of the CCD method is that an optical path length (a distance light travels from a subject to a sensor) is as extremely long as 200 mm to 500 mm. In an image reading device, in order to ensure such an optical path length within a limited space in a carriage, a plurality of plane mirrors are used to cause a light travel direction to vary. This undesirably leads to an increase in component count and thus to a cost increase. Furthermore, in a case where lenses are used in an optical system, chromatic aberration occurs due to a difference in refractive index depending on a wavelength. Correcting chromatic aberration requires the use of a plurality of lenses. Such use of a plurality of lenses also results in a cost increase.

In the CIS method, by use of a plurality of erect equal-magnification rod lenses arranged in an array, an image is formed on an image sensor that is equal in size to an original document and then is read. One advantage of the CIS method is that, compared with the CCD method, a relatively short optical path length of 10 mm to 20 mm is obtained, and thus miniaturization is achieved. It is also advantageous that imaging is performed using the rod lenses alone without requiring the use of mirrors, which are required in the CCD method, so that a scanner unit incorporating a CIS sensor therein can be reduced in thickness and has a simple structure, thus achieving a cost reduction. The CIS method is disadvantageous, however, in that a depth of field obtained is extremely small, and thus when an original document is displaced in an optical axis direction from a predetermined position, a significant influence of blurring results from image bleeding due to deviations in magnification between the individual lenses. As a result, a book document or an original document with an uneven surface cannot be read uniformly.

In recent years, there has been proposed a method in which, unlike in the above-described CCD method and CIS method, an image is read using a reflection mirror array in an imaging optical system. In this method, by use of a plurality of reflection mirrors arranged in an array, an original document read on a region-by-region basis in different reading regions corresponding to the reflection mirrors, respectively, is formed into a reduced-scale inverted image on a sensor. In this method, however, unlike in the CIS method using the rod lens array, one region is read and formed into an image by use of one optical system. Furthermore, since an imaging method using a telecentric optical system is adopted, when an original document is read on a region-by-region basis in a plurality of regions, there occurs no image bleeding due to images with different magnifications overlapping with each other, thus suppressing image blurring, so that a compound-eye reading method is established.

Moreover, in this method, the optical system uses the mirrors alone, and thus unlike in the case where lenses are used in an optical system, there occurs no chromatic aberration. Consequently, there is no need for correction related to chromatic aberration, and thus the number of elements constituting the optical system can be reduced.

SUMMARY

A reading module having a first configuration of the present disclosure is provided with a light source, an optical system, and a sensor. The light source radiates light to an illumination object. The optical system images, as reading light, reflected light of light radiated from the light source to the illumination object. The sensor includes a plurality of imaging regions for converting the reading light imaged by the optical system into an electric signal, which are arranged in a prescribed direction. The optical system is provided with a mirror array in which a plurality of reflection mirrors each having an aspherical concave surface as a reflection surface are disposed in an array in the prescribed direction and a plurality of aperture stop portions each of which is provided between each of the plurality of reflection mirrors and a corresponding one of the plurality of imaging regions of the sensor and adjusts an amount of the reading light reflected on the each of the plurality of reflection mirrors. Each of the plurality of reflection mirrors is disposed at a prescribed distance from an adjacent one of the plurality of reflection mirrors in the prescribed direction.

Still other objects of the present disclosure and specific advantages provided by the present disclosure will be made further apparent from the following description of an embodiment.

DETAILED DESCRIPTION

Figure 1:
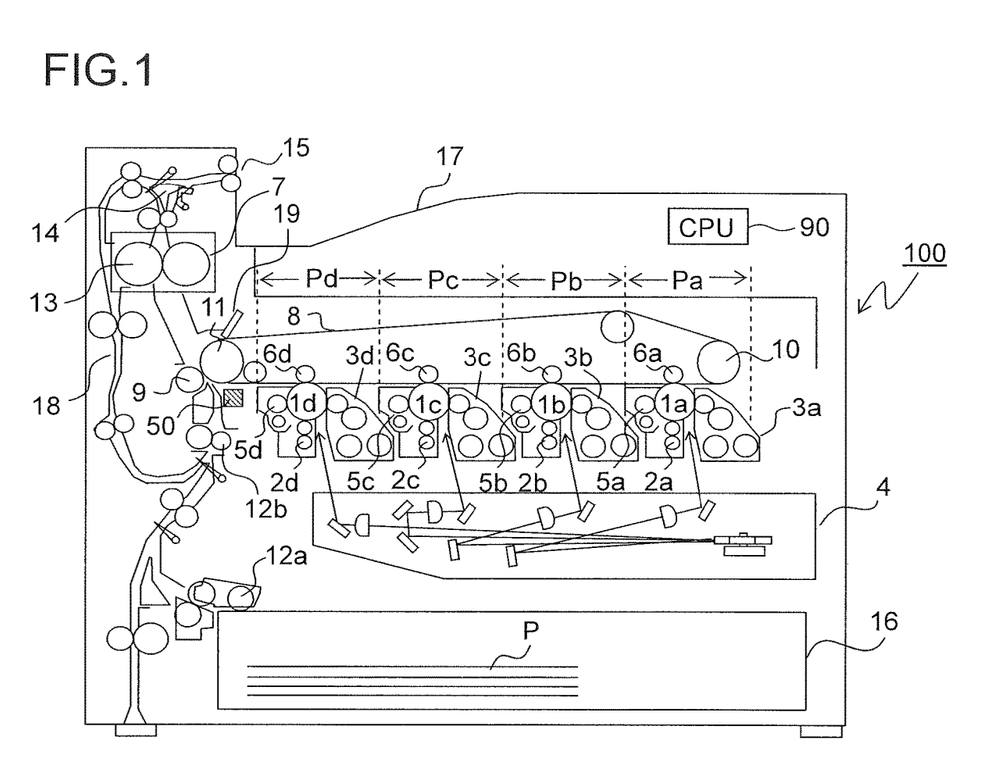
FIG. 1 is a side sectional view showing an overall configuration of an image forming apparatus 100 provided with a reading module 50 of the present disclosure.

With reference to the appended drawings, the following describes an embodiment of the present disclosure. FIG. 1 is a schematic configuration view of an image forming apparatus provided with a reading module (reading device, image reading unit) 50 of the present disclosure, showing herein a tandem-type color printer. In a main body of a color printer (image forming apparatus) 100, four image forming portions Pa, Pb, Pc, and Pd are arranged in order from an upstream side of an intermediate transfer belt (an illumination object, an image carrier) 8 in a traveling direction (a right-hand side in FIG. 1). The image forming portions Pa to Pd are provided so as to correspond to images of four different colors (cyan, magenta, yellow, and black) and sequentially form images of cyan, magenta, yellow, and black, respectively, by following steps of charging, exposure, development, and transfer.

In the image forming portions Pa to Pd, photosensitive drums 1a, 1b, 1c, and 1d that carry visible images (toner images) of the respective colors are arranged, respectively, and the intermediate transfer belt 8 that rotates in a clockwise direction in FIG. 1 is further provided adjacently to the image forming portions Pa to Pd.

Upon an input of image data from a host apparatus such as a personal computer, first, surfaces of the photosensitive drums 1a to 1d are uniformly charged by chargers 2a to 2d, respectively. Next, by an exposure device 4, based on the image data, light is radiated to the photosensitive drums 1a to 1d so that electrostatic latent images based on the image data are formed thereon. Each of developing devices 3a to 3d is filled with a prescribed amount of two-component developer (hereinafter, referred to simply as a developer) containing toner of a corresponding one of the respective colors of cyan, magenta, yellow, and black supplied from toner containers (not shown) and a magnetic carrier. By the developing devices 3a to 3d, the toner contained in the developer is supplied onto the photosensitive drums 1a to 1d, respectively, and electrostatically adheres thereto. Thus, there are formed toner images based on the electrostatic latent images formed through exposure from the exposure device 4.

Then, by each of primary transfer rollers 6a to 6d, an electric field is applied at a prescribed transfer voltage between the each of primary transfer rollers 6a to 6d and a corresponding one of the photosensitive drums 1a to 1d so that the toner images of cyan, magenta, yellow, and black on the photosensitive drums 1a to 1d, respectively, are primarily transferred on the intermediate transfer belt 8 laid under tension over a driving roller 11 and a driven roller 10. After such primary transfer, residual toner or the like remaining on the surfaces of the photosensitive drums 1a to 1d is removed by cleaning devices 5a to 5d, respectively.

A transfer sheet P on which a toner image is to be transferred is housed in a paper sheet cassette 16 disposed in a lower portion in the color printer 100. At prescribed timing, the transfer sheet P is conveyed via a paper sheet roller 12a and a registration roller pair 12b to a nip portion (a secondary transfer nip portion) between a secondary transfer roller 9 provided adjacently to the intermediate transfer belt 8 and the intermediate transfer belt 8. In the secondary transfer nip portion, the toner images on a surface of the intermediate transfer belt 8 are transferred on the transfer sheet P. After such transfer, a belt cleaning device 19 cleans residual toner remaining on the inter mediate transfer belt 8. The transfer sheet P on which the toner images have been secondarily transferred is conveyed to a fixing portion 7.

The transfer sheet P conveyed to the fixing portion 7 is heated and pressed by a fixing roller pair 13 so that the toner images are fixed on a surface of the transfer sheet P, and thus a prescribed full-color image is formed thereon. The transfer sheet P on which the full-color image has been formed is directly (or after being conveyed to a reverse conveyance path 18 by a branch portion 14 and thus being subjected to double-sided image formation) discharged by a discharge roller pair 15 onto a discharge tray 17.

The reading module 50 that reads a toner image formed on the intermediate transfer belt 8 is disposed on a downstream side of the image forming portion Pd and immediately near the secondary transfer roller 9 on an upstream side thereof. The reading module 50 radiates measurement light to each of density correction patterns (patch images) formed on the intermediate transfer belt 8 in the image forming portion Pa to Pd, receives reflected light therefrom, photoelectrically converts the reflected light into a light reception output signal, and outputs the light reception output signal. An output value thereof is subjected to ND conversion and then is transmitted as a sensor output value (an output value) to an after-mentioned control portion 90.

In the main body of the color printer 100, there is disposed the control portion (CPU) 90 that controls operations of the color printer 100 as a whole. The control portion 90 has the following function. That is, when a mode for properly setting densities of images of the respective colors (hereinafter, referred to as a calibration mode) has been set by a key operation or the like on an operation panel (not shown), the control portion 90 receives an output signal from an after-mentioned sensor 41 of the reading module 50, determines a density of a reference image on the basis of density data stored in a storage portion (not shown), compares the density with a preset reference density, adjusts, based on a result of the comparison, a development bias of each of the developing devices 3a to 3d, and thus performs a density correction with respect to each of the respective colors. A configuration may be adopted in which the calibration mode is automatically set upon power-on of the color printer 100 or upon completion of mage formation processing on a prescribed number of sheets.

Figure 2:
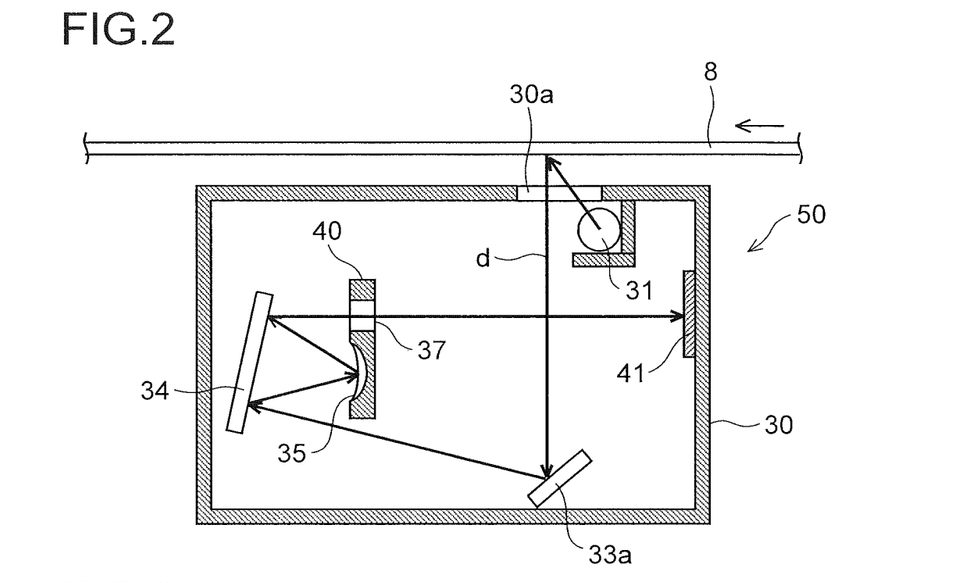
FIG. 2 is a side sectional view showing an internal structure of the reading module 50 according to one embodiment of the present disclosure.
Figure 3:
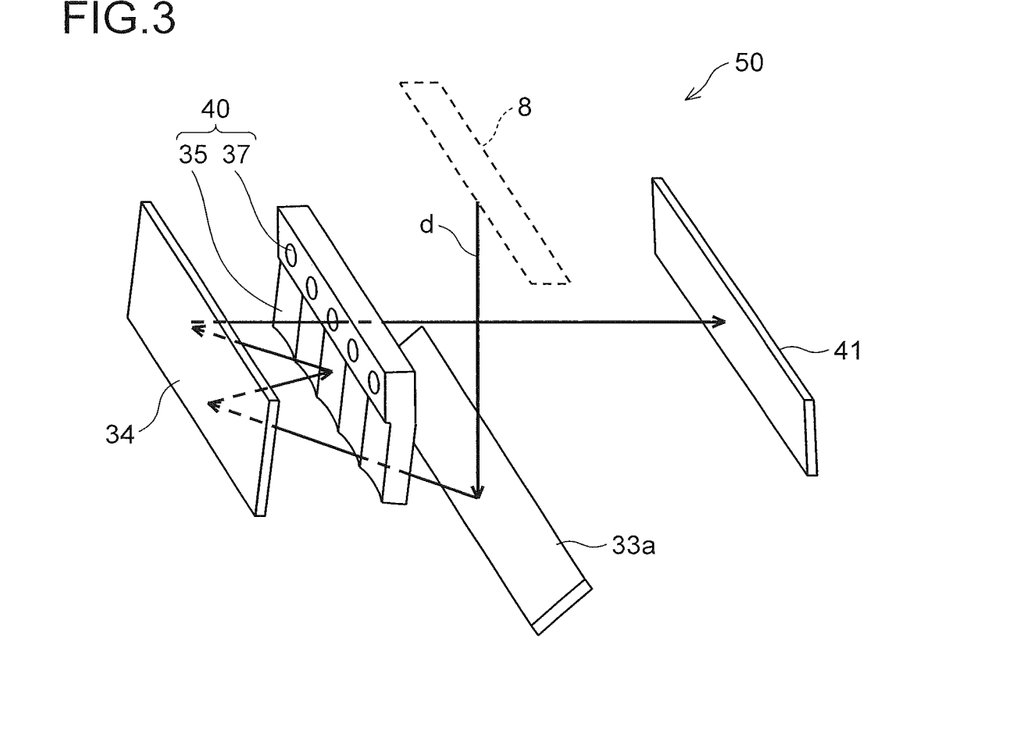
FIG. 3 is a partial perspective view showing an optical path from an intermediate transfer belt 8 to a sensor 41 in the reading module 50 of one embodiment of the present disclosure.
Figure 4:
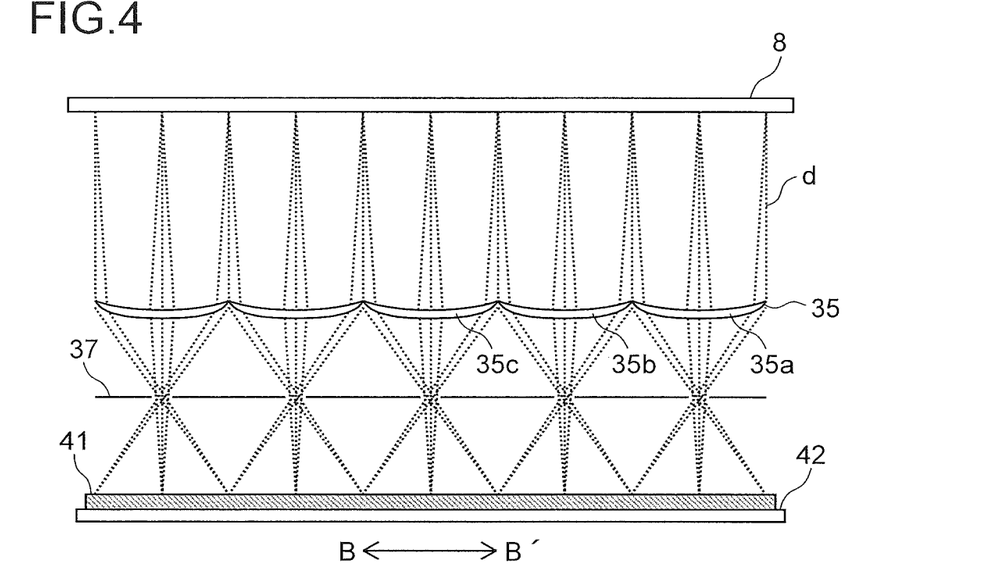
FIG. 4 is a plane sectional view showing a configuration between an optical unit 40 and the sensor 41 in the reading module 50 of one embodiment of the present disclosure.

FIG. 2 is a side sectional view showing an internal structure of the reading module 50 according to this embodiment, FIG. 3 is a perspective view showing an optical path from the intermediate transfer belt 8 to the sensor 41 in the reading module 50 of this embodiment, and FIG. 4 is a plane sectional view showing a configuration between an optical unit 40 and the sensor 41 in the reading module 50 of this embodiment. In FIG. 4, although a mirror array 35 as a component of the optical unit 40 reflects a ray of light, for the sake of convenience of explanation, there is shown a model in which a ray of light is transmitted through the optical unit 40.

The reading module 50 reads an image on a surface side (a lower surface side in FIG. 2) of the intermediate transfer belt 8.

As shown in FIG. 2, in a housing 30 of the reading module 50, there are provided a light source 31, a plane mirror 33a, a turning mirror 34, a mirror array 35 composed of a plurality of reflection mirrors each having an aspherical concave surface as a reflection surface, an aperture stop portion 37, and the sensor 41 as a reading unit. The sensor 41 is supported to a sensor substrate 42 (see FIG. 4).

In the above-described configuration, in a case of reading an image on the intermediate transfer belt 8, light that has been emitted from the light source 31 and then passed through an opening 30a is radiated to an image surface of the intermediate transfer belt 8. As a result, light reflected on the image surface of the intermediate transfer belt 8 acts as image light (reading light) d (shown by a solid line arrow in FIG. 2), and the image light d, after having an optical path thereof changed by the plane mirror 33a, is reflected on the turning mirror 34. The image light d thus reflected is converged by the mirror array 35 and then is reflected again on the turning mirror 34, after which the image light d passes through the aperture stop portion 37 and is imaged on the sensor 41. The image light d thus imaged is pixelated into pixels in the sensor 41, which are then converted into electric signals based on respective densities of the pixels, and thus image reading is performed.

As shown in FIG. 3, the mirror array 35 and the aperture stop portion 37 are made of a common material and integrally formed into one unit as the optical unit (optical system) 40. By integrally forming the mirror array 35 with the aperture stop portion 37, a relative position between the mirror array 35 and the aperture stop portion 37 can be retained with high accuracy. Thus, it is possible to effectively prevent a phenomenon in which, due to a temperature change, expansion or contraction of the mirror array 35 and the aperture stop portion 37 occurs to cause the relative position to vary, resulting in degradation of imaging performance. In consideration of a cost, desirably, the optical unit 40 including the mirror array 35 and the aperture stop portion 37 are fabricated by injection molding using resin.

The turning mirror 34 is installed at a position opposed to the mirror array 35 and reflects both of a ray of light (the image light d) traveling from the intermediate transfer belt 8 via the plane mirror 33a, which is to enter the mirror array 35, and a ray of light (the image light d) reflected on the mirror array 35, which is to enter the aperture stop portion 37. An optical path of the ray of image light d traveling toward the mirror array 35 and an optical path of the ray of image light d traveling toward the aperture stop portion 37 are in substantially the same direction (a right-hand direction in FIG. 2).

As shown in FIG. 4, the mirror array 35 that images the image light d on the sensor 41 has a configuration in which a plurality of reflection mirrors 35a, 35b, 35c, . . . corresponding to prescribed regions of the sensor 41, respectively, are disposed in an array in a prescribed direction (an arrow BB' direction).

As shown in FIG. 3, the aperture stop portion 37 is a circular opening and adjusts an amount of light, as the image light d, to be imaged on the sensor 41.

According to the configuration of this embodiment, the image light d reflected on reading regions Ra, Rb (see FIG. 5), . . . of the intermediate transfer belt 8, which are obtained by dividing the intermediate transfer belt 8 in the prescribed direction, has its optical path changed by the plane mirror 33a and the turning mirror 34 (see FIG. 2) and enters the reflection mirrors 35a, 35b, 35c, . . . of the mirror array 35. The image light d is reflected at an equal imaging magnification by each of the reflection mirrors 35a, 35b, 35c, . . . and reflected again by the turning mirror 34. After that, the image light d passes through the aperture stop portion 37 and is imaged as an inverted image in a corresponding one of imaging regions on the sensor 41.

The inverted image formed in each of the imaging regions is converted into a digital signal. With respect to each of the imaging regions, data is reversed into an erect image, and then such images in the imaging regions are connected together to form an output image.

Furthermore, the aperture stop portion 37 is disposed at a focal point of each of the reflection mirrors 35a, 35b, 35c, . . . constituting the mirror array 35, and thus a physical separation distance (a distance in an up-down direction in FIG. 2) between the aperture stop portion 37 and the mirror array 35 is determined depending on a reduction magnification (herein, an equal magnification) of the mirror array 35. The reading module 50 of this embodiment has a configuration in which a ray of light is reflected twice on the turning mirror 34, and thus it is possible to ensure an optical path length from the mirror array 35 to the aperture stop portion 37 and to minimize an entrance/reflection angle of the image light d with respect to the mirror array 35. As a result, curvature of an image formed in each of imaging regions 41a, 41b (see FIG. 5), . . . can be suppressed.

Furthermore, in a case where the turning mirror 34 is divided into a plurality of mirrors, light reflected on an edge portion of each of the mirrors acts as stray light and undesirably enters the mirror array 35 or the aperture stop portion 37. By using a single plane mirror as the turning mirror 34 as in this embodiment, an influence of stray light is prevented even when both the rays of light overlap with each other on the turning mirror 34. While in this embodiment, the plane mirror 33a is used so that the reading module 50 is reduced in size in a height direction, a configuration without the plane mirror 33a is also possible.

In the compound-eye reading method using the mirror array 35 as in this embodiment, when an imaging magnification varies depending on a position of the intermediate transfer belt 8 (hereinafter, referred to as a "belt position") in each of the regions thereof corresponding to the reflection mirrors 35a, 35b, 35c, . . . (an optical path length between each of the reflection mirrors 35a, 35b, 35c, . . . and the intermediate transfer belt 8), in a case where the intermediate transfer belt 8 is bent upward or downward, images overlap with each other or are separated from each other at positions adjacent to boundary portions between the reflection mirrors 35a, 35b, 35c, . . . , so that there occurs a failure in reading image densities.

In this embodiment, a telecentric optical system is adopted between the intermediate transfer belt 8 and the mirror array 35, in which a principal ray of image light d is parallel to an optical axis. The telecentric optical system has a feature that the principal ray of image light d passing through a center of the aperture stop portion 37 is perpendicular to the surface of the intermediate transfer belt 8.

Thus, even when the belt position varies, an imaging magnification of each of the reflection mirrors 35a, 35b, 35c, . . . does not vary, so that even in a case where reading is performed with respect to finely divided regions of the intermediate transfer belt 8, the reading module 50 can prevent occurrence of image bleeding and provide a deep depth of field. In this case, however, regardless of the belt position, the principal ray needs to be set beforehand to be perpendicular to the surface of the intermediate transfer belt 8, and it is, therefore, required that the mirror array 35 have a size in the prescribed direction (the arrow BB' direction) equal to or larger than a size of the reading regions of the intermediate transfer belt 8.

In the compound-eye reading method using the mirror array 35 as mentioned above, when the image light d that has been reflected by the reflection mirrors 35a, 35b, 35c, . . . and passed through the aperture stop portion 37 is imaged in a prescribed region on the sensor 41, there is a fear that a component of the image light d traveling outside the reading regions might act as stray light and enter a region on the sensor 41 adjacent to the prescribed region.

Figure 5:
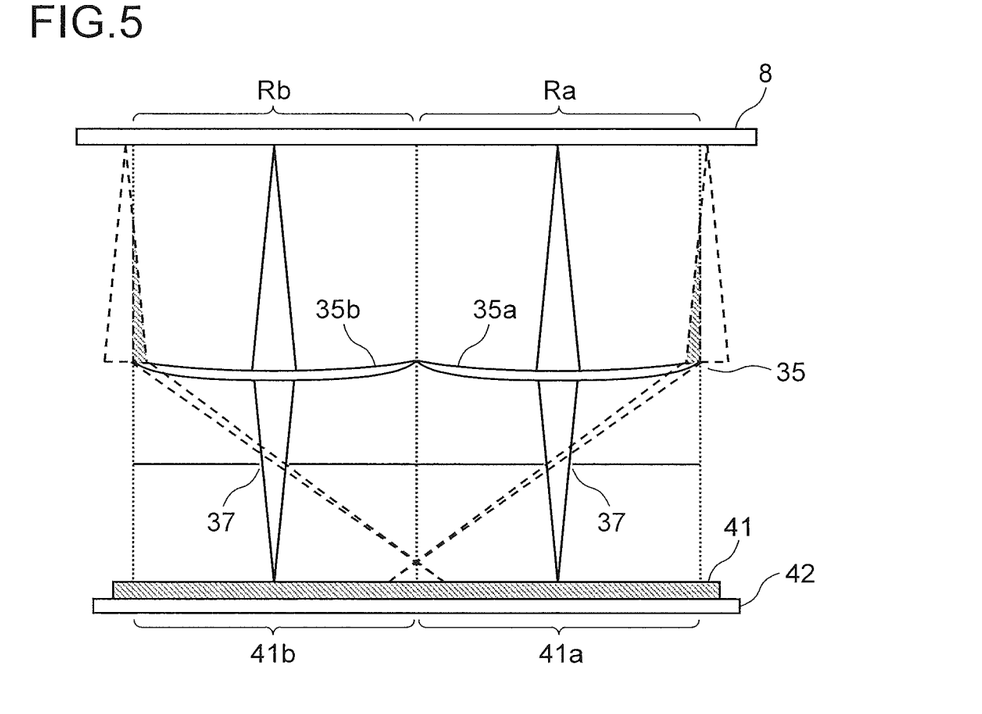
FIG. 5 is a view showing how image light d acts as stray light and enters the sensor 41.

FIG. 5 is a view showing how the image light d acts as stray light and enters the sensor 41. As shown in FIG. 5, light from the reading regions Ra and Rb corresponding to the reflection mirrors 35a and 35b, respectively, is imaged in corresponding imaging regions 41a and 41b on the sensor 41, respectively. Herein, even when light travels from outside the reading regions Ra and Rb, rays thereof (indicated by hatched regions in FIG. 5) traveling inward of the principal ray are also imaged on the sensor 41 by the reflection mirrors 35a and 35b, respectively. Specifically, light reflected on the reflection mirror 35a enters the adjacent imaging region 41b, and light reflected on the reflection mirror 35b enters the adjacent imaging region 41a. These rays of imaging light, though in a trace amount, form inverted images corresponding to reading regions different from those they have entered. When such inverted images are superimposed on images supposed to be formed in the imaging regions 41a and 41b, there occurs a failure in reading image densities.

Figure 6:
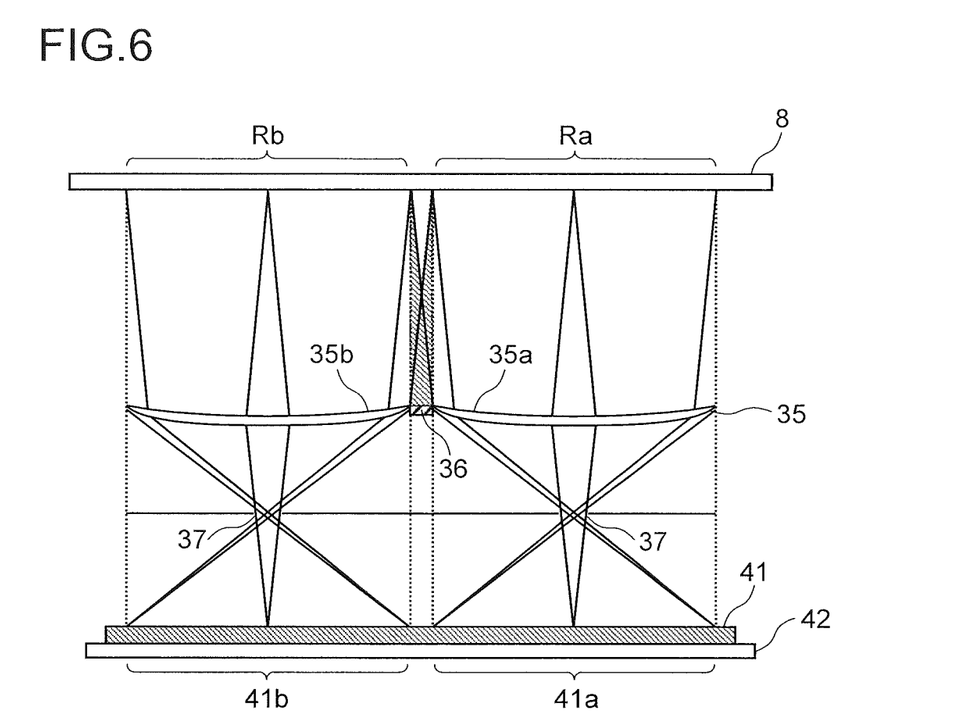
FIG. 6 is a partial enlarged view showing the optical path between the intermediate transfer belt 8 and the sensor 41, illustrating a configuration in which a non-imaging region 36 is provided between reflection mirrors 35a and 35b.
Figure 7:
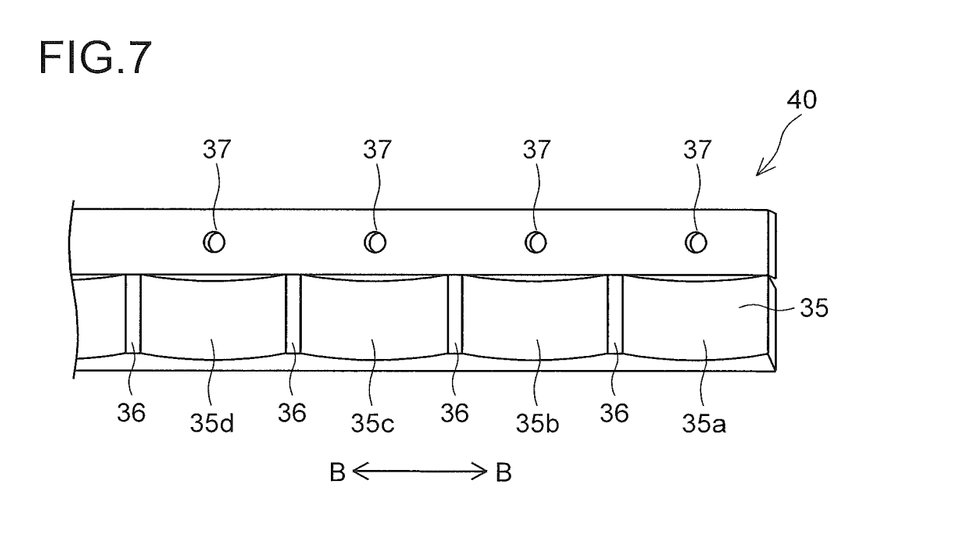
FIG. 7 is a partial perspective view showing a configuration of the optical unit 40 in the reading module 50 of one embodiment of the present disclosure.
Figure 8:
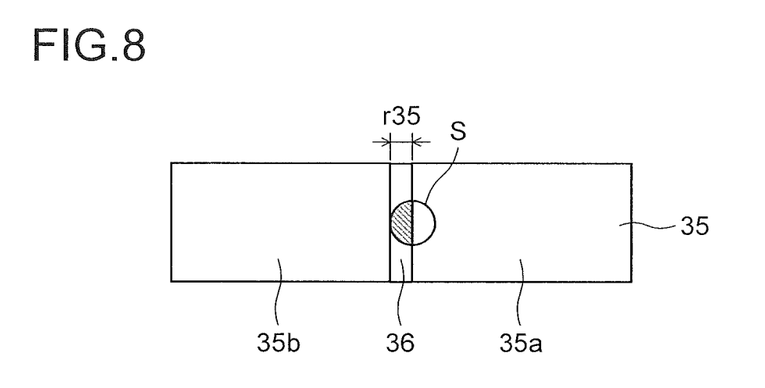
FIG. 8 is a view showing a vicinity of the non-imaging region 36 and an entrance pupil S of the reflection mirror 35a in the reading module 50 of one embodiment of the present disclosure.

As a solution to this, as shown in FIG. 6 and FIG. 7, each of the reflection mirrors 35a, 35b, 35c, . . . is disposed at a prescribed distance from an adjacent one of them in the prescribed direction (the arrow BB' direction). In this embodiment, in the prescribed direction, each of the reflection mirrors 35a, 35b, 35c, . . . is disposed at a distance equal to or greater than a radius r35 of an entrance pupil S (see FIG. 8) of the reflection mirrors 35a, 35b, 35c, . . . from an adjacent one of them. Between each pair of adjacent ones of the reflection mirrors 35a, 35b, 35c . . . , there is provided a non-imaging region 36 that is a plane surface.

In the specification and the claims of the present disclosure, an entrance pupil refers to a region on a reflection mirror in which, among rays of light emitted in various directions from one point on a surface of an illumination object (herein, the intermediate transfer belt 8), a bundle of rays effective for imaging enters the reflection mirror. In other words, this refers to a region on a reflection surface of a reflection mirror to which a bundle of rays of light passing from one point on a sensor through an aperture stop portion is extended.

By providing the non-imaging region 36, as shown in FIG. 6, for example, light from the reading region Ra can be prevented from being imaged on the sensor 41 by the reflection mirror 35b, and light from the reading region Rb can be prevented from being imaged on the sensor 41 by the reflection mirror 35a. That is, the image light d can be prevented from acting as stray light and entering the sensor 41.

In the reading module 50, since the non-imaging region 36 is provided between each pair of adjacent ones of the reflection mirrors 35a, 35b, 35c, . . . , it is impossible to read an image in a region on the surface of the intermediate transfer belt 8 (a region between each pair of adjacent ones of the reading regions Ra, Rb, . . . ) corresponding to the non-imaging region 36.

In this embodiment, as described above, each of the reflection mirrors 35a, 35b, 35c, is disposed at a prescribed distance from an adjacent one of them in the prescribed direction. Thus, it is possible to suppress a phenomenon in which light reflected on an adjacent one of the reflection mirrors 35a, 35b, 35c, . . . passes through the aperture stop portion 37 and arrives, as flare light (stray light), at the sensor 41. This can suppress a failure in reading image densities.

Moreover, in this embodiment, as described above, in the prescribed direction, each of the reflection mirrors 35a, 35b, 35c, . . . is disposed at a distance equal to or greater than the radius r35 of the entrance pupil S of the reflection mirrors 35a, 35b, 35c, . . . from an adjacent one of them. Thus, light reflected on an adjacent one of the reflection mirrors 35a, 35b, 35c, . . . can be reliably prevented from passing through the aperture stop portion 37 and arriving, as flare light (stray light), at the sensor 41.

Figure 9:
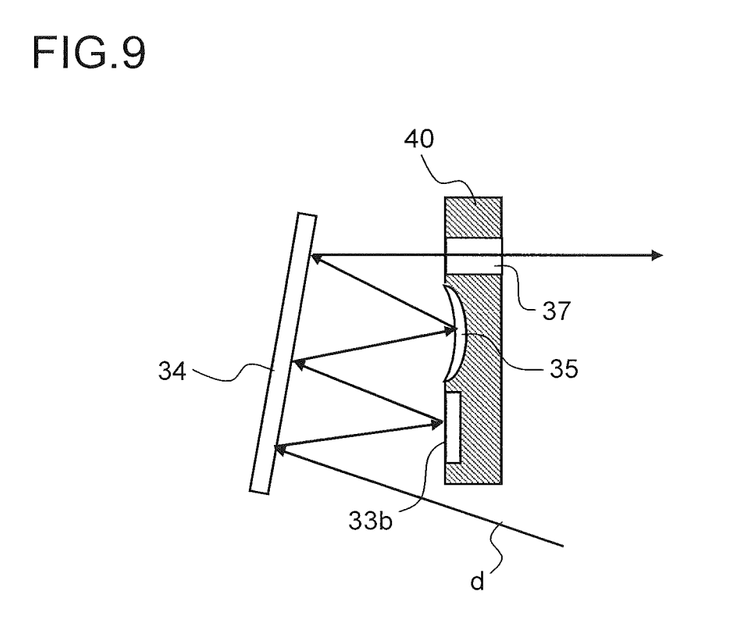
FIG. 9 is a partial sectional view showing a modification example of the reading module 50 of the present disclosure, illustrating a configuration in which the image light d is reflected three times on a turning mirror 34.

Other than the above, the present disclosure is not limited to the foregoing embodiment and can be variously modified without departing from the purport of the present disclosure. For example, while in the foregoing embodiment, by use of the turning mirror 34, a ray of image light d traveling from the intermediate transfer belt 8 via the plane mirror 33a, which is to enter the mirror array 35, and a ray of image light d reflected on the mirror array 35, which is to enter the aperture stop portion 37, are each reflected once, i.e., the image light d is reflected twice in total, a configuration may also be adopted in which a plane mirror 33b is disposed in the optical unit 40 as shown in FIG. 9 so that, by use of the turning mirror 34, the image light d is reflected three or more times.

Furthermore, while the foregoing embodiment has described an example in which a patch image formed on the surface of the intermediate transfer belt 8 is read by the reading module 50, the present disclosure is not limited thereto. A configuration may also be adopted in which a patch image formed on the surface of each of the photosensitive drums (image carriers) 1a to 1d is read by the reading module 50. Furthermore, since the non-imaging region 36 is provided between each pair of adjacent ones of the reflection mirrors 35a, 35b, 35c, . . . , chipping might occur in a read image. For this reason, the reading module 50 may be used in applications in which such occurrence of chipping in a read image does not interfere with an intended purpose, such as in a sensor that detects presence/absence of an image. Furthermore, for example, a configuration may also be adopted in which a side end edge of the intermediate transfer belt 8 is read by the reading module 50 so that meandering of the intermediate transfer belt 8 is detected. In this case, the surface of the intermediate transfer belt 8 may be directly read, or reading may be performed in such a manner that an image having a light reflectance higher than that of the surface of the intermediate transfer belt 8 is formed at the side end edge of the intermediate transfer belt 8 and this image is read.

What is claimed is:

1. An image forming apparatus, comprising:
an intermediate transfer belt that carries a toner image; and
a reading module,
wherein
the reading module includes:
a light source that radiates light to the intermediate transfer belt;
an optical system that images, as reading light, reflected light of light radiated from said light source to the intermediate transfer belt; and
a sensor that includes a plurality of imaging regions for converting the reading light imaged by said optical system into an electric signal, which are arranged in a prescribed direction,
the optical system includes:
a mirror array in which a plurality of reflection mirrors each having an aspherical concave surface as a reflection surface are disposed in an array in the prescribed direction; and
a plurality of aperture stop portions each of which is provided between each of the plurality of reflection mirrors and a corresponding one of the plurality of imaging regions of the sensor and adjusts an amount of the reading light reflected on the each of the plurality of reflection mirrors,
wherein each of the plurality of reflection mirrors is disposed at a prescribed distance from an adjacent one of the plurality of reflection mirrors in the prescribed direction, and
wherein the optical system is a telecentric optical system in which, on a side toward the intermediate transfer belt with respect to the mirror array, a principal ray of the reading light is parallel to an optical axis, the principal ray being perpendicular to a surface of the intermediate transfer belt, and an inverted image is formed on the sensor by the optical system.

2. The image forming apparatus according to claim 1, wherein in the prescribed direction, each of the plurality of reflection mirrors is disposed at a distance equal to or greater than a radius of an entrance pupil of the plurality of reflection mirrors from an adjacent one of the plurality of reflection mirrors.

3. The image forming apparatus according to claim 1, wherein
a turning mirror is disposed that is provided at a position opposed to the mirror array and turns, toward the plurality of aperture stop portions, the reading light reflected on the plurality of reflection mirrors, and
the turning mirror turns, by using a same reflection surface thereof, the reading light twice or more times including turning of a component of the reading light, which is to travel toward the plurality of reflection mirrors, and turning of a component of the reading light reflected on the plurality of reflection mirrors, which is to travel toward the plurality of aperture stop portions.

4. The image forming apparatus according to claim 3, wherein the mirror array and the plurality of aperture stop portions are formed integrally with each other.

5. The image forming apparatus according to claim 1, wherein the mirror array has a size in the prescribed direction equal to or larger than a size of a reading region of the intermediate transfer belt.

6. A reading module, comprising:
a light source that radiates light to an illumination object;
an optical system that images, as reading light, reflected light of light radiated from said light source to the illumination object;
a sensor that includes a plurality of imaging regions for converting the reading light imaged by said optical system into an electric signal, which are arranged in a prescribed direction; and
a turning mirror,
wherein
the optical system includes:
a mirror array in which a plurality of reflection mirrors each having an aspherical concave surface as a reflection surface are disposed linearly in the prescribed direction; and
a plurality of aperture stop portions each of which is provided between each of the plurality of reflection mirrors and a corresponding one of the plurality of imaging regions of the sensor and adjusts an amount of the reading light reflected on the each of the plurality of reflection mirrors,
wherein
each of the plurality of reflection mirrors is disposed at a distance equal to or greater than a radius of an entrance pupil of the plurality of reflection mirrors from an adjacent one of the plurality of reflection mirrors in the prescribed direction,
a non-imaging region that is a plane surface is provided between each pair of adjacent ones of the reflection mirrors,
the turning mirror is provided at a position opposed to the mirror array, and turns, toward the plurality of aperture stop portions, the reading light reflected on the each of the plurality of reflection mirrors, and
only a space exists between the non-imaging region and the turning mirror.

7. The reading module according to claim 6, wherein the optical system is a telecentric optical system in which, on a side toward the illumination object with respect to the mirror array, the reading light is parallel to an optical axis, and an inverted image is formed on the sensor by the optical system.

8. The reading module according to claim 6, wherein the turning mirror turns, by using a same reflection surface thereof, the reading light twice or more times including turning of a component of the reading light, which is to travel toward the plurality of reflection mirrors, and turning of a component of the reading light reflected on the plurality of reflection mirrors, which is to travel toward the plurality of aperture stop portions.

9. The reading module according to claim 8, wherein the mirror array and the plurality of aperture stop portions are formed integrally with each other.

10. An image forming apparatus comprising the reading module according to claim 6.

11. The image forming apparatus according to claim 10, wherein the illumination object is an image carrier that carries a toner image.

12. A reading module, comprising:
a light source that radiates light to an illumination object;
an optical system that images, as reading light, reflected light of light radiated from said light source to the illumination object;

a sensor that includes a plurality of imaging regions for converting the reading light imaged by said optical system into an electric signal, which are arranged in a prescribed direction;

a first plane mirror, and a turning mirror, wherein the optical system includes:

a mirror array in which a plurality of reflection mirrors each having an aspherical concave surface as a reflection surface are disposed in an array in the prescribed direction; and a plurality of aperture stop portions each of which is provided between each of the plurality of reflection mirrors and a corresponding one of the plurality of imaging regions of the sensor and adjusts an amount of the reading light reflected on the each of the plurality of reflection mirrors, wherein the mirror array and the plurality of aperture stop portions are integrally formed into one unit as an optical unit, each of the plurality of reflection mirrors is disposed at a prescribed distance from an adjacent one of the plurality of reflection mirrors in the prescribed direction, the mirror array is disposed on a front surface of the optical unit, the turning mirror is disposed at a position opposed to the front surface of the optical unit, the first plane mirror reflects, toward the turning mirror, the reading light traveling behind a rear surface of the optical unit, and the turning mirror turns, toward the optical unit, the reading light reflected on the first plane mirror, and turns, toward the plurality of aperture stop portions, the reading light reflected on the plurality of reflection mirrors.

13. The reading module according to claim 12, wherein in the prescribed direction, each of the plurality of reflection mirrors is disposed at a distance equal to or greater than a radius of an entrance pupil of the plurality of reflection mirrors from an adjacent one of the plurality of reflection mirrors.

14. The reading module according to claim 12, wherein the optical system is a telecentric optical system in which, on a side toward the illumination object with respect to the mirror array, the reading light is parallel to an optical axis, and an inverted image is formed on the sensor by the optical system.

15. The reading module according to claim 12, wherein the optical unit includes a second plane mirror, and the turning mirror turns, toward the second plane mirror, the reading light reflected on the first plane mirror, turns, toward the mirror array, the reading light reflected on the first plane mirror, and turns, toward the plurality of aperture stop portions, the reading light reflected on the plurality of reflection mirrors.

16. An image forming apparatus comprising the reading module according to claim 12.

17. The image forming apparatus according to claim 16, wherein the illumination object is an image carrier that carries a toner image.

* * * * *